Aug. 13, 1935.  E. M. SORENG  2,010,935
COUPLING DEVICE
Filed Dec. 7, 1932  2 Sheets—Sheet 2
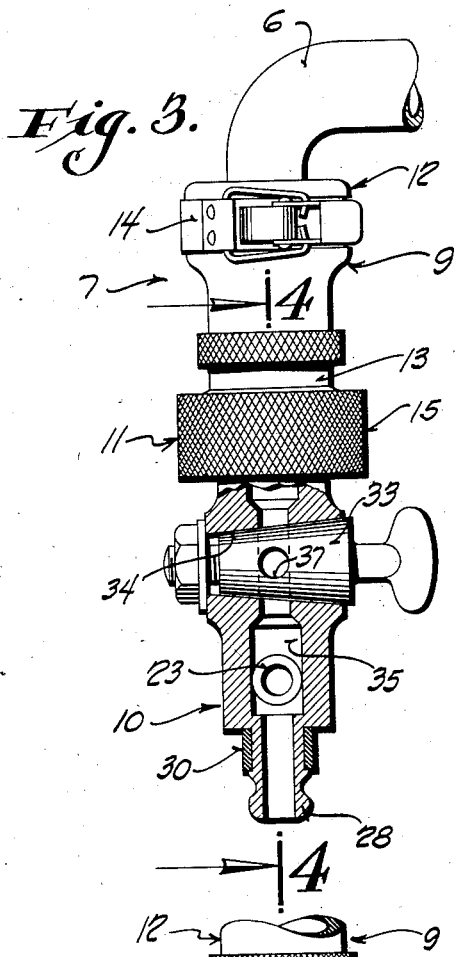
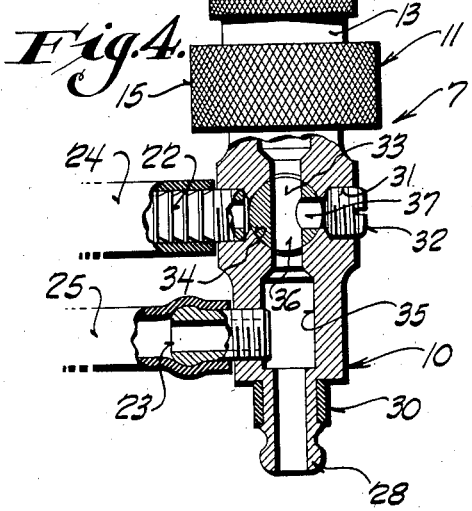
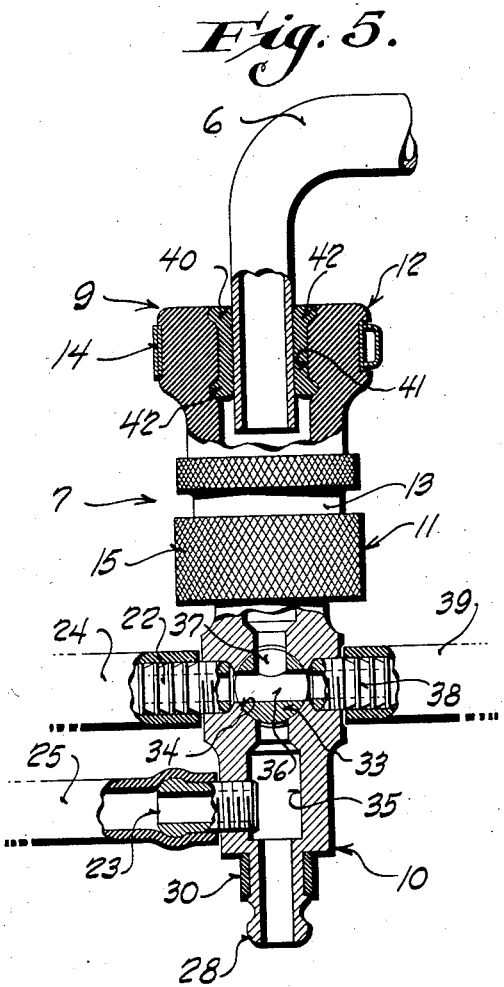
Inventor
Edgar M. Soreng
By
Worney Patented Aug. 13, 1935

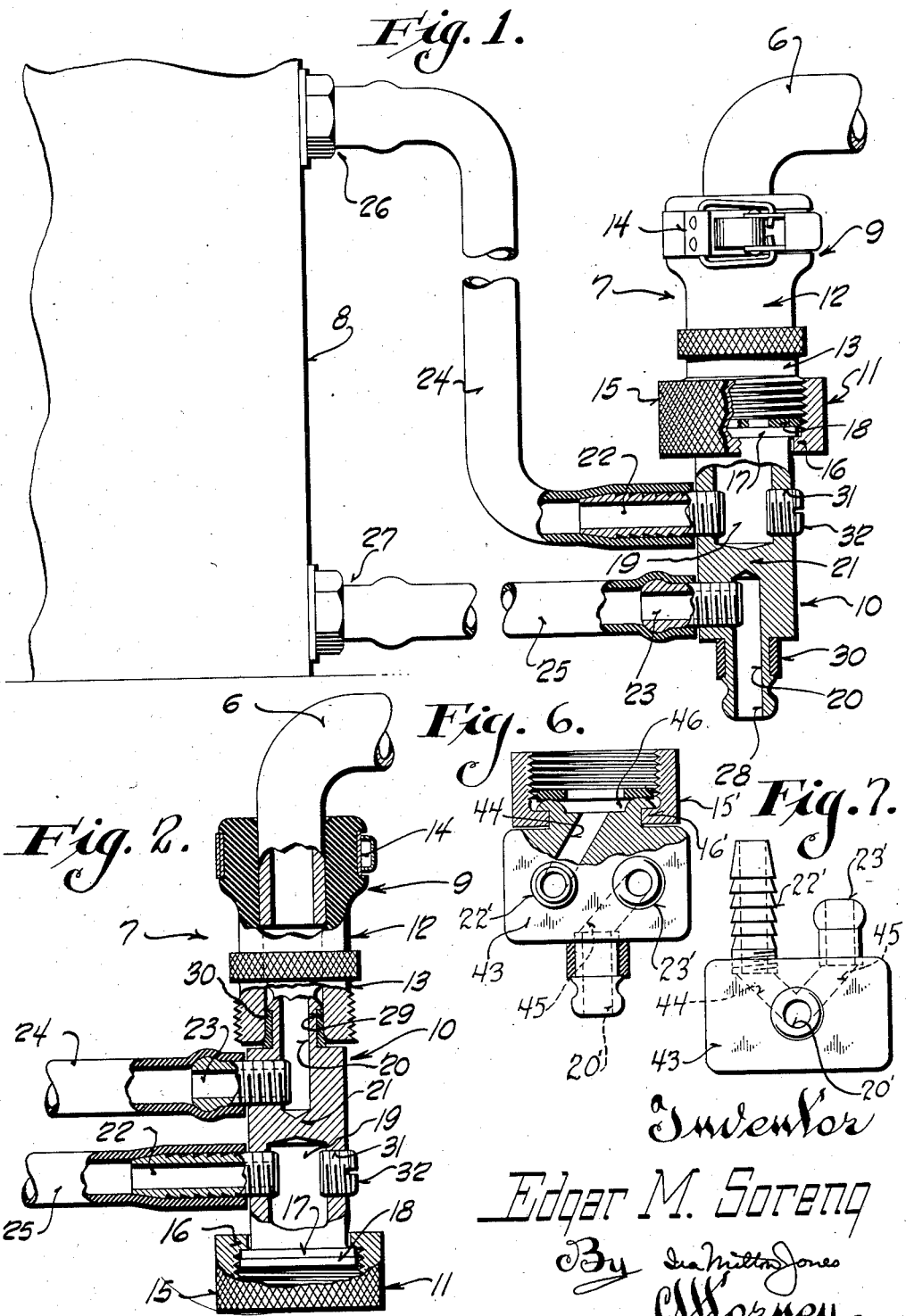

2,010,935

UNITED STATES PATENT OFFICE 2,010,935

COUPLING DEVICE

Edgar M. Soreng, Chicago, Ill., assignor to Soreng Manegold Company, Chicago, Ill., a corporation of Illinois Application December 7, 1932, Serial No. 646,089

5 Claims. (Cl. 137—111)

This invention relates to certain new and useful improvements in coupling devices and refers more particularly to couplings for connecting water softeners, filters, or other water treating appliances, with faucets.

It is an object of this invention to provide a simple coupling device of the character described, which is easily attached to a faucet and has means to connect a filter, water softener, or other similar appliance in series with a water faucet.

Another object of this invention is to provide a coupling of the character described, which has means to connect a water treating appliance with a faucet in such a manner that the final discharge is from a coupling part directly beneath the faucet.

Another object of this invention is to provide a coupling of the character described, which is so constructed as to permit the direction of flow through the filter, softener, or other appliance, which it connects to the faucet, to be quickly and easily reversed.

Another object of this invention is to provide a coupling of the character described, which may be used as a mixing valve for hot and cold water.

And a further object of this invention is to provide a coupling of the character described with valve means whereby water from the faucet may be by-passed through a filter, softener, or other appliance or discharged directly without first passing through such appliance.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated two complete examples of the physical embodiment of my invention constructed according to the best modes I have so far devised for the practical application of the principles thereof, and in which:

Figure 1 is a side elevation with parts broken away and in section, of the coupling shown attached to a faucet and connected with an appliance which diagrammatically represents a filter, softener, or other water treating device;

Figure 2 is a view similar to Fig. 1, but with the lower section of the coupling inverted to reverse the direction of flow through the appliance;

Figure 3 is a side elevation with parts broken away and in section illustrating a slightly modified embodiment of the invention;

Figure 4 is a detail section view taken through Fig. 3, on the plane of the line 4—4;

Figure 5 illustrates another modified adaptation of this invention;

Figure 6 is a view partly in elevation and partly in section illustrating another modification of this invention; and Figure 7 is a bottom view of the structure shown in Fig. 6.

Referring now more particularly to the accompanying drawings, in which like numerals indicate like parts throughout the several views, the numeral 6 represents the discharge end of a conventional water faucet to which the coupling indicated generally by the numeral 7 is attached. The coupling as shown in Fig. 1, is arranged to by-pass the water discharged from the faucet 6 through an appliance such as a filter or water softener indicated diagrammatically at 8, the water discharged from the softener or filter being conducted back to the coupling to be discharged directly beneath the faucet.

Specifically, the coupling consists of an upper section 9 and a lower section 10 separably connected by means of a union 11. The upper section 9 comprises a tubular rubber attaching member or bushing 12 having its lower end embedded in a sleeve or collar 13 which forms part of the union 11. The rubber bushing is adapted to snugly engage over the discharge end of the faucet where it is held by a suitable clamping band 14 encircling its upper end. The specific construction of the clamping band forms no part of this invention, but it is desirable to provide an adjustable element for this purpose.

The collar 13 at the lower end of the rubber attaching bushing is externally threaded to receive the nut 15 of the union 11. The nut is engaged over the upper end of the lower section 10 and has an internal shoulder 16 to engage the underside of an annular flange 17 formed on the extreme upper end of the lower section. Threading of the nut 15 onto the collar 13 thus draws the lower section upwardly, a rubber washer 18 being confined between the collar 13 and the flange 17 to prevent leakage.

The lower section 10, which may be considered the body member of the coupling, has an axial bore 19 opening to its upper end and a second axial bore 20 opening to its lower end. The bores 19 and 20 are separated or closed off from each other by a partition wall 21 extending across the medial portion of the body member.

Each bore has a port leading laterally therefrom. The port of the upper bore 19 has a hollow stem 22 fixed therein and the port of the lower bore 20 has a tubular stem 23 fixed therein. These stems provide means for attaching hoses 24 and 25 to the coupling. The hose 24 connects the stem 22 with the inlet 26 of the filter, softener or other appliance, and as the upper bore 19 communicates with the faucet through the upper section of the coupling, the inlet of the appliance is thereby connected with the faucet. The other hose 25 connects the discharge 27 of the appliance with the stem 23 so that the actual discharge is from the open lower end 28 of the body member, which may be formed as a nozzle. The discharge is thus located at its normal position directly beneath the outlet of the faucet 6.

If the appliance 8 is a filter, it is often desirable for purposes of cleaning to reverse the flow of water therethrough. This may be quickly and easily done by merely inverting the lower section or body member 10 after disconnecting the union 11, and inserting the end 28 thereof in the bore 29 of the collar 13. To provide a fluid tight joint, the end 28 carries a rubber sleeve 30 which has a snug fit in the bore 29.

At a point diametrically opposite the attaching stem 22 is a threaded bore 31 closed in Figs. 1 and 2 by a plug 32. This threaded opening 31 affords means for the attachment of a second stem similar to the stem 22 so that the coupling may be connected with a second source of water supply as for instance a hot water faucet, as will be hereinafter more fully described.

In Figs. 3 and 4, the coupling is shown provided with a valve 33 whereby the water may be shunted directly past the filter or other appliance. In this construction, the valve takes the place of the partition wall 21. The valve is of the conventional tapered plug type and is rotatably mounted in a correspondingly tapered bore 34 which intersects the axial bore 35 through the lower section or body member at an intermediate point. The plug 33 has one port 36 extending diametrically therethrough and a second port 37 communicating with the port 36 and extending at right angles thereto.

Hence, with the valve in its position shown in Fig. 4, the water will be shunted past the filter or softener to be discharged directly from the lower end 28 of the coupling, and by turning the valve 90 degrees in a counter-clockwise direction from its position shown in Fig. 4, water will be by-passed through the filter or softener as will be readily apparent.

In Fig. 5, the lower coupling section 10 is provided with a second attaching stem 38 diametrically opposite the stem 22 in place of the plug 32. This second stem 38, may be connected by means of a hose 39, with the hot water faucet. Thus, the coupling may be used as a mixing valve, and to cause both hot and cold water to be by-passed through the filter or softener.

By turning the valve 33, 90 degrees in a clockwise direction from its position shown in Fig. 5, it is evident that both hot and cold water will be shunted past the appliance connected with the coupling. The specific position of rotation of the valve plug with respect to the bore 34 and the stem 38 determines the ratio of the mixture of hot and cold water as will be readily apparent.

Where the faucet, being equipped, is unusually small in diameter, a removable bushing 40 is inserted in the bore 41 of the rubber attaching bushing 12. This auxiliary bushing 40 is in the form of a spool with flanges 42 at its ends to be pressed into the wall of the bore 41 as the clamping band is drawn tight. In this manner, the coupling may be securely attached to a small diameter faucet.

In some instances, a long extension beneath the end of the faucet may be objectionable. In such cases, the lower section of the coupling may be constructed as illustrated in Figs. 6 and 7. As here shown, the body 43 of the coupling is substantially cubical and has tubular stems 22' and 23' mounted on one side. The bore of the stem 22' communicates with a diagonal port 44, which leads upwardly to the top of the body for communication with the upper section of the coupling as will be readily apparent, and the tubular stem 23' communicates with a second diagonal bore 45 which extends downwardly to communicate with the discharge 28'.

Attached to the upper end of the body is a coupling nut 15'. The specific manner of attachment of the nut to the body is immaterial, but in the present instance is effected by spinning the upper end of an annular upstanding rim 46 over the flange 16' of the nut.

With this structure, the stems 22' and 23' to which the hoses are attached are disposed side-by-side rather than one above the other which enables a substantial reduction in the overall height of the coupling, as will be readily apparent.

From the foregoing description taken in connection with the accompanying drawings, it will be readily apparent to those skilled in the art to which this invention appertains, that this invention affords a novel coupling for connecting water softeners or filters with water faucets in such a manner that the final discharge of water is at its normal point directly beneath the faucet. It is also apparent that by means of this coupling, reversal of flow in a filter is readily accomplished without entailing the disconnection and re-connection of hoses, and that it provides a convenient mixing valve for hot and cold water.

What I claim as my invention is:

1. A coupling of the character described comprising, a tubular attaching member connectible to a faucet, an externally threaded collar carried by the attaching member and having a bore forming substantially a continuation of the faucet bore, a body member having a bore opening at each end, means medially of the ends of the body member to separate the bore opening to one end from the bore opening to the other end, an annular flange at one end of the body member, coupling means engaging said flange and the threaded collar of the attaching member to removably secure the body member to the attaching member, hose connections carried by the body member at opposite sides of said separating means to provide means for connecting an appliance with the coupling, whereby liquid issuing from the faucet flows through said appliance in its passage to said discharge end of the body member, said discharge end being arranged for insertion into the bore of the collar so that the direction of flow through the appliance may be reversed without removing the hose connections and without removing the attaching member from the faucet.

2. In a coupling of the character described, a body member having an inlet and an outlet separated from each other, means to connect the inlet and outlet with an appliance through which liquid is to flow in its passage from the inlet to the outlet, an attaching member formed of rubber and connectible to a faucet, an externally threaded collar on the rubber attaching member, said collar having a bore, an internally threaded coupling sleeve at one end of the body member for connecting said end of the body member to the attaching member, the other end of the body member having a portion insertable into the bore of the collar for connecting said end of the body member to the attaching member, and a bushing carried by said portion of the body member to frictionally engage the wall of the bore to afford a fluid tight connection.

3. In a coupling of the character described, a tubular body member, one end of said body member, one end of said body member forming a discharge nozzle, means to connect the inlet and outlet of a liquid treating appliance with the tubular body member at spaced points, means to connect the other end of the body member with a faucet, valve means in the body member to cause liquid entering it from the faucet to flow through one of said appliance connecting means into the appliance, and to be returned through the other of said connecting means back to the tubular body member to issue from its first mentioned end affording a discharge nozzle, and means to connect a second faucet with the tubular body member adjacent the valve means, communication of said second faucet with the tubular body member being controlled by the valve means.

4. In a coupling of the character described, a tubular body member having spaced inlets to be connected with different sources of liquid supply and having an outlet opening serving as a discharge nozzle, a port communicating with the interior of the tubular body adjacent one of said inlets, a second port communicating with the interior of the tubular body between said first port and the outlet opening, means to connect said ports ports with a liquid treating appliance, and a valve to control communication between said inlets and the interior of the tubular body member and to control communication of the first mentioned port with the interior of the body member whereby liquid from both of said sources in any desired ratio may be caused to enter the treating appliance to return to the tubular member through the second port and be discharged from the outlet of the tubular member, or may be discharged directly from the tubular body member outlet without passing through the treating appliance.

5. A coupling of the character described, comprising a tubular attaching member of deformable material securable to a faucet, means to adjust the attaching member to the diameter of the faucet, a tubular body member, means to connect the tubular body member with the attaching member with the interior of the tubular body member in communication with the faucet through the attaching member, a hose connection for connecting the interior of the body member with a second faucet, a mixing valve in the body member to adjust the ratio of liquid entering the body member from said two faucets, and means to connect a liquid treating appliance with the interior of the body member, communication of the treating appliance with the interior of the body member being controlled by said valve.

EDGAR M. SORENG.